May 2, 1939.                    W. PHILLIPS                      2,156,304
                         INTERNAL COMBUSTION ENGINE
                           Filed June 10, 1936        2 Sheets-Sheet 2
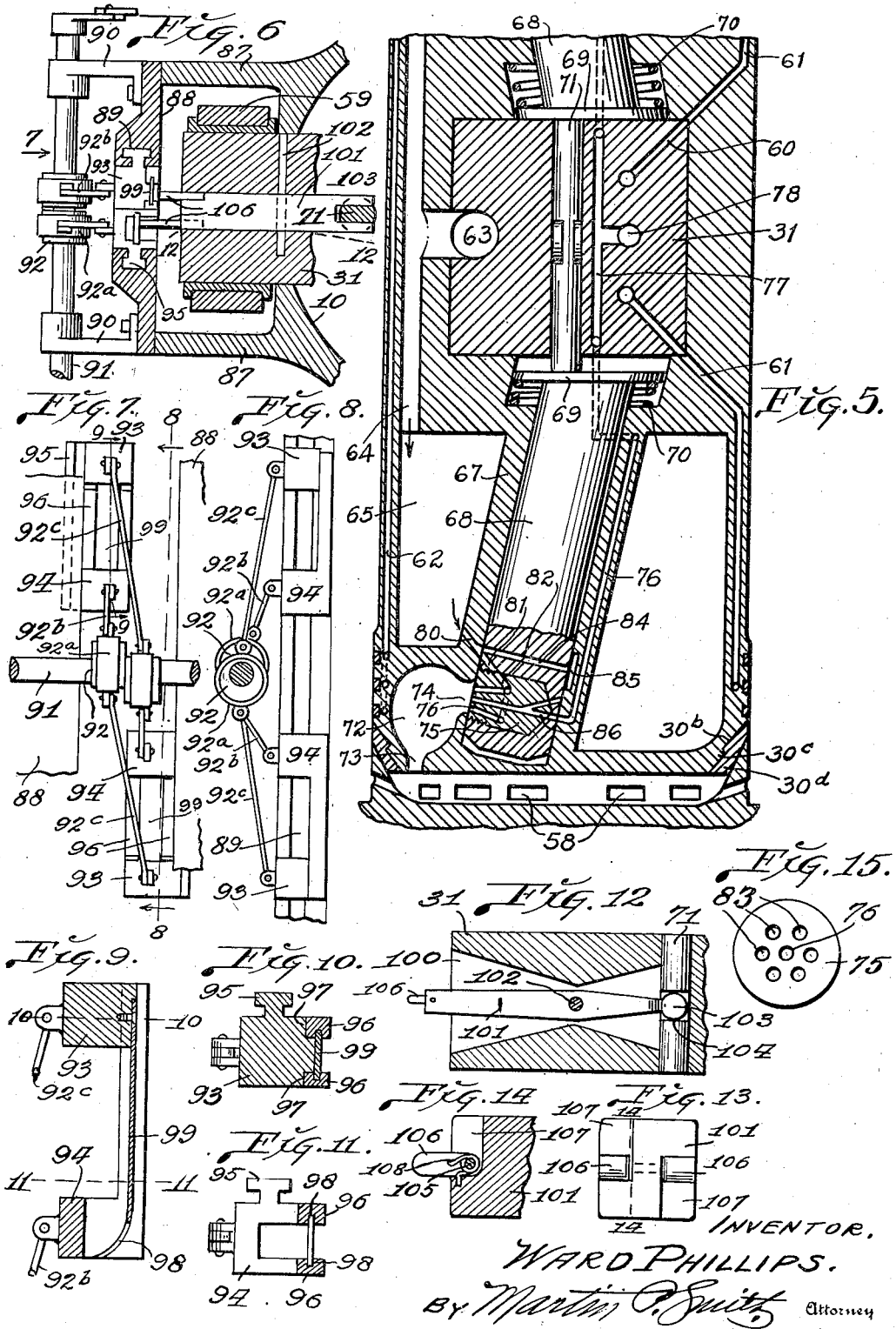
INVENTOR.
WARD PHILLIPS.
By Martin P. Smith  Attorney Patented May 2, 1939

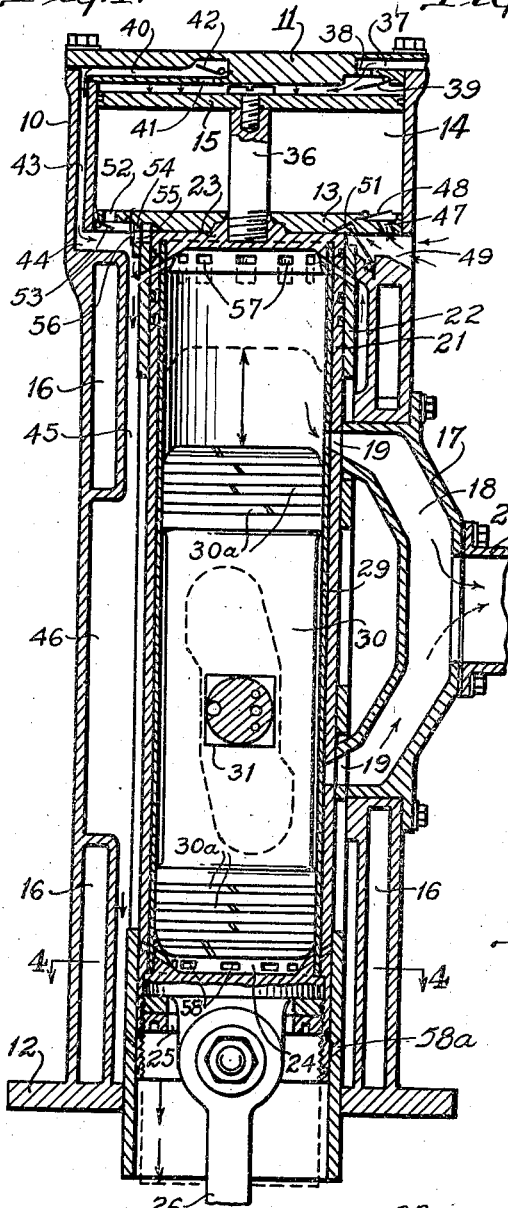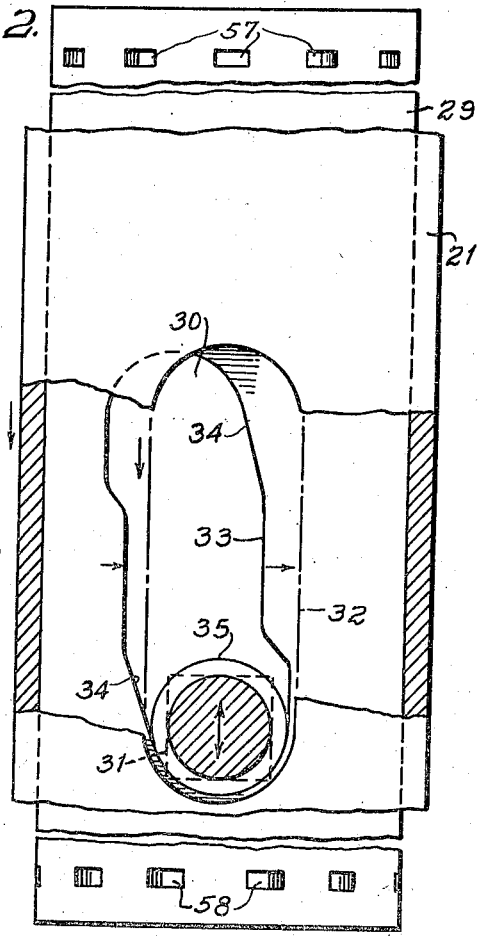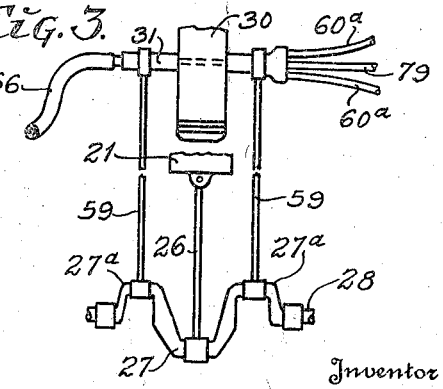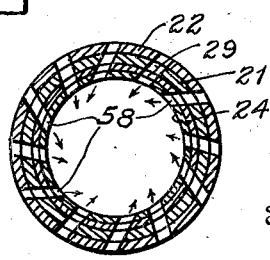

2,156,304

UNITED STATES PATENT OFFICE 2,156,304

INTERNAL COMBUSTION ENGINE

Ward Phillips, Los Angeles, Calif.

Application June 10, 1936, Serial No. 84,516

20 Claims. (Cl. 123—50)

My invention relates to an internal combustion engine of the one stroke cycle type, and has for its principal objects, to generally improve upon and simplify the construction of the existing forms of one stroke cycle internal combustion engines, and to provide an internal combustion engine having the desirable characteristics of relative lightness of weight, compactness, and capable of producing the greatest possible degree of power from a given quantity of fuel.

Further object of my invention is to provide an internal combustion engine, having a piston mounted for reciprocatory movement within a cylinder, and the latter being mounted for reciprocatory movement, so that the piston and cylinder are simultaneously moved in opposite directions as the compressed gaseous fuel charges are alternately ignited in the chambers between the ends of the piston and cylinder, and said piston and cylinder being connected by conventional connecting rods to a crankshaft, so that all of the expansive forces of the ignited fuel charges against the piston ends and cylinder heads are utilized to rotate the crank shaft in its bearings and the application of the power resulting from such expansive forces being applied on opposite sides of the crankshaft bearings, so that all thrust is transmitted to said crankshaft as torque.

Further objects of my invention are to arrange between the reciprocating piston and reciprocating cylinder, a sleeve, which in addition to reciprocating with the cylinder, has a limited degree of oscillatory movement, so as to control the scavenging air and exhaust ports that lead to and from the chambers between the ends of the piston and the heads of the cylinder; further to provide means for imparting oscillatory movement to the sleeve by a piston pin that passes diametrically through the center of the piston; further to provide simple and efficient means for scavenging the products of combustion from the chambers between the ends of the piston and the heads of the cylinder after the ignition of the gaseous fuel charges, and further to provide simple and efficient means for circulating cooling fluid through the outer shell or frame that encloses the reciprocating parts of the engine.

A further object of my invention is, to combine with one end of the housing or frame, pumps that are operated by the reciprocating cylinder, and which pumps are effective in compressing air utilized for supercharging the combustion chambers.

A further object of my invention is to provide an engine of the character referred to, a piston provided in its ends with relatively small ignition and pre-combustion chambers, and to arrange in the end portions of the piston, valves that are actuated by means associated with the piston pin for controlling the admission of air and liquid hydro-carbon into said ignition and pre-combustion chambers and for the combustion chambers.

With the foregoing and other objects in view, my invention consists in certain novel features of construction and arrangements of parts that will be hereinafter more fully described and claimed and illustrated in the accompanying drawings in which:

Fig. 1 is a vertical section taken through the center of an internal combustion engine constructed in accordance with my invention.

Fig. 2 is an elevational view partly in section, and with parts broken away of the reciprocating cylinder, and the sleeve that is carried by said cylinder, and which surrounds the piston, and said view showing the cam slot that is formed in the sleeve for imparting oscillatory movement to said sleeve.

Fig. 3 is an elevational view of portions of the piston and cylinder of the engine, and showing the connections between said piston and cylinder and the crankshaft.

Fig. 4 is a horizontal section taken on the line 4—4 of Fig. 1, and showing the reciprocating piston, the sleeve that is positioned within the same, and the jacket that is arranged between the cylinder and the housing or frame of the engine.

Fig. 5 is a vertical section taken through the lower portion of the piston, and showing the valve that controls the admission of air and liquid hydro-carbon to the ignition and pre-combustion chamber.

Fig. 6 is a horizontal section taken through the side portions of the engine and showing the means for timing the admission of gaseous fuel charges into the ends of the engine cylinder.

Fig. 7 is an elevational view of the parts seen looking in the direction indicated by arrow 7 in Fig. 6.

Fig. 8 is a vertical section taken approximately on the line 8—8 of Fig. 7.

Fig. 9 is an enlarged vertical section taken on the line 9—9 of Fig. 7.

Fig. 10 is a horizontal section taken on the line 10—10 of Fig. 9.

Fig. 11 is a horizontal section taken on the line 11—11 of Fig. 9.

Fig. 12 is a detailed section taken approximately on the line 12—12 of Fig. 6.

Fig. 13 is an end elevational view of the lever utilized for moving the pushpin that imparts movement to the fuel control admission means.

Fig. 14 is a vertical section taken on the line 14—14 of Fig. 13.

Fig. 15 is an end elevational view of a plug provided with jet openings, and which is seated in the gaseous fuel inlet control valves.

Referring by numerals to the accompanying drawings, 10 designates a housing or frame that encloses the operating parts of my improved engine, and one end of this housing or frame is provided with a removable head 11.

If the engine is arranged so that the piston and cylinder reciprocate vertically, the head 11 is at the upper end of frame 10, and the lower end of said frame is provided with a suitable flange 12, whereby the engine may be mounted on a suitable base.

Removably located on the upper portion of frame 10, a short distance below head 11, is a partition 13, and the chamber 14 between said partition and head 11 functions as a pumping chamber in which operates a piston 15. The wall or guiding frame 10 below the removable partition 13, is provided with chambers 16, through which may be circulated a cooling fluid, such as water, in order to disseminate the heat developed during engine operation. Formed in the side wall of frame 10, is an opening in which is removably positioned a block 17, through which is formed an exhaust duct 18, the ends of which are open to provide exhaust outlet ports 19. At the center of block 17, duct 18 is provided with an opening that communicates with an exhaust outlet pipe 20.

Arranged for reciprocatory movement within the chamber in guiding frame 10, is a cylinder 21, and immediately surrounding said cylinder and interposed between the frame 10 and cylinder, is a guiding jacket 22. The upper end of cylinder 21 is provided with a fixed head 23, and the lower end of said cylinder is provided with a removable head 24. This removable head is positioned in the lower portion of the cylinder, and is retained therein by one or more rings 25 that are screwed into the internally threaded lower portion of the cylinder. Pivotally connected to the lower head 24, is one end of a connecting rod 26, the lower or opposite end of which is connected to one of the cranks 27, that are formed on a crankshaft 28. Mounted for oscillatory movement within the cylinder 21, and positioned immediately against the inner face of the wall thereof, is a sleeve 29, and mounted for reciprocatory movement within said sleeve is a piston 30.

In order to reduce friction between the piston and sleeve in which said piston reciprocates and between the cylinder and the guiding frame, the end portions of said piston 30 are slightly larger in diameter than the intermediate portion of said piston, and seated in the larger ends of said piston, are oil rings 30a.

At both ends of piston 30, the corners between the end and peripheral surface are cut away to form inclined faces 30b with a shoulder 30c between said faces. Fitted onto the ends of the piston and overlying the inclined faces 30b, are split packing rings 30d, the inner faces of which are inclined so as to bear directly against said inclined faces 30b.

In effect, these rings 30d provide effective packing between the ends of the piston and the cylinder wall, particularly during high-pressure of the gaseous fuel charges and during the expansion of the ignited fuel charges.

Under such conditions, the developed high-pressure bears against the outer end faces of the packing rings thus tending to force the same longitudinally of the piston, and due to the provision of the inclined faces 30b, the packing rings will expand to tightly engage the inner face of the cylinder wall and thereby effectively prevent the leakage of pressure between the end portions of the piston and the cylinder wall.

Extending diametrically through the center of piston 30, is the non-circular portion of a piston pin 31, and the end portion thereof that projects beyond the piston, is round in cross section, as illustrated in Figs. 1 and 2, and said round end projects through a slot 33 that is formed in the wall of sleeve 29. The intermediate portion of this slot is straight and parallel with the slot 32, and the end portion 34 of said slot 33 is inclined in opposite directions, as illustrated in Figs. 1 and 2.

Thus the slots 33 function as cam slots, so that as the piston and cylinder are reciprocated, a slight oscillatory movement will be imparted to sleeve 29 as said piston and cylinder approach the ends of their travel.

This oscillatory movement of the sleeve 29 is accomplished in order to effect the opening and closing of certain ports hereinafter more fully described.

To decrease friction between the projecting portions of the piston pin and the edges of the slot 33, an anti-friction ring 35 is mounted on the projecting end of the piston pin and bear on the edges of said slot 33.

Seated in head 23 of the piston, is the lower end of a short axial rod 36, the upper end of which is detachably connected to piston 13. Formed in one side of head 11, is an atmospheric air inlet duct 37, the inner end of which communicates with the upper end of pump chamber 14 by means of a port 38, and adapted to close this port on the upward stroke of piston 15 is a flap-check valve 39.

Formed in the opposite side of head 11 is an air duct 40, the inner end of which communicates through a port 41 with the upper portion of chamber 14, and controlling this port 41 is a flap-check valve 42 that is arranged to close on the downward movement of piston 15, and to open on the upper movement thereof.

The upper end of duct 40 communicates with a duct 43 formed in the upper portion of frame 10, and the lower end of this duct 43 communicates with a chamber 44 that is formed in frame 10 immediately beneath partition 13. Chamber 44 communicates by means of an annular space 45 with an air chamber 46 that is formed in the intermediate portion of frame 10.

Formed in partition 13 adjacent the edge thereof, is an air inlet port 47 controlled by a downwardly seating check valve 48 that is positioned on top of partition 13, and this port communicates with an air inlet port 49 that is formed in the frame or housing 10. The inner end of port 49 communicates with the chamber within jacket 22, and the inner end of said port is controlled by an outwardly seating check valve 51.

Formed in the other side of partition 13 is an air outlet port 52 controlled by a flap check valve 53 that is arranged on the under side of partition 13. Depending from partition 13 into chamber 44 and overlying jacket 22, is a wall 54 in which is formed a port 55 controlled by a flap check valve 56 that is arranged on the outer face of said wall 54.

The construction just described constitutes in effect, a secondary pump where the upper portion of the cylinder on its downward stroke, draws air in through inlet port 49 past check valve 51, and on the upward stroke of said cylinder the air thus drawn into the chamber above the cylinder, is forced out port 55 past check valve 56, to unite with the air that is pumped into chambers 44 and 46 by the double-acting pump that operates within chamber 14.

Formed through the upper portion of sleeve 29, through cylinder 21 and through jacket 22, are ports 57 that are for the purpose of admitting air from annular chamber 45 into the upper end of the piston chamber within sleeve 29, and as illustrated in Fig. 4, these ports are arranged at different angles, and to a certain extent tangentially with respect to the parts in which they are formed, in order to produce a whirling or circular motion of the air that is admitted to the piston chamber.

The flow of air through these ports is controlled by the sleeve 29 which, it will be understood, is slightly oscillated by the action of the piston pin 31 traversing the slot 33 as the piston reciprocates within the cylinder.

Air inlet ports 58 that are practically identical with the air inlet ports 57, are formed through the upper portion of removable head 24 at the lower end of the cylinder, through the lower portion of sleeve 29, and through the lower portion of cylinder 21 for the purpose of admitting air from chamber 46 to the lower end of the piston chamber, and the outer ends of these air inlet ports are adapted to communicate with inlet ports 58a that are formed through the lower portion of jacket 22 when the cylinder assembly comprising the sleeve and cylinder are at the lower end of their travel.

These portions of the air inlet ports 57 and 58 that are formed in the sleeve 29 are staggered or offset with respect to each other, so as to control and bring about the alternate admission of air to the ends of the piston chamber in accordance with the movements of the piston in said chamber, and when the lower ports 58 are closed, as illustrated in Fig. 1, the upper ports 57 are open.

This staggered arrangement of the ports in the sleeve is illustrated in Fig. 2.

That portion of the piston pin 31 that passes through piston 30, is preferably non-circular or square, as illustrated in Fig. 5, and the end portions of said piston pin that project through the slot 32 and 33 in sleeve 29 and cylinder 21, and through a vertically disposed slot formed in the jacket 22 and the frame or housing 10, are round, as illustrated in Fig. 2.

In Fig. 6 one end of a connecting rod 59 is shown mounted on the rounded end portion of the piston pin 31, and the other end of this connecting rod 59 is journalled on a crank 27a of crank shaft 27, and which is disposed immediately to the side of and diametrically opposite crank 27 to which the cylinder piston rod 26 is connected.

Formed in one end portion of piston pin 31 are lubricating oil ducts 60, the outer ends of which are connected by ducts 60a to a suitable source of liquid lubricant supply under a certain amount of pressure.

The inner ends of these ducts 60 communicate with ducts 61 that are formed in piston 30, and which lead to the grooves in the piston that receives the oil rings 30a, and the inner members of each set of oil ring grooves are connected by a lubricating oil circulation duct 62. Thus, provision is made for lubricating the piston during its reciprocatory movements.

Formed in piston pin 31 is a high-pressure air duct 63, the same communicating by means of ducts 64 that are formed in the central portion of piston 30 with high-pressure air chambers 65 that are formed in the end portions of the piston.

The outer end of the high-pressure air duct 63 is connected by a duct 66 to a suitable source of air under high-pressure, for instance, a storage tank or a high-pressure pump.

Formed integral with the piston pin 31 and extending through the high-pressure air chambers 65, are cylinders 67 that connect the central portion of the piston that carries the piston pin, with the end portions of said piston.

Arranged for reciprocatory movement within each cylinder 67 is a piston 68 provided on its inner end or the end adjacent the piston pin with a plate 69. Arranged beneath each plate 69 is an expansive coil spring 70 that tends to force the piston 68 toward the center of the piston.

Arranged for sliding movement diametrically through the piston 30 is a pushpin 71, the ends of which bear on the plates 69. This pushpin is actuated by means hereinafter more fully described.

The pistons 68 are utilized for controlling the admission of the gaseous fuel charges to the ends of the chamber within which the piston reciprocates.

Formed in the end portions of the piston are combined ignition and precombustion chambers 72, the same communicating through ports 73 with the end portions of the piston chamber, and a port 74 formed between each pre-combustion chamber 72 and the piston chamber in the adjacent cylinder 67.

Removably seated in the outer portion of each piston 68, and disposed at right angles to the axis of said piston, is a plug 75 provided with an axial duct 86 that communicates with the lower end of a fuel oil supply duct 76 that extends lengthwise through the wall of cylinder 67, and the upper portion of said duct 76 communicates with a duct 77 that is formed in piston pin 31. This last mentioned duct communicates with a duct 78 that extends lengthwise through a part of the piston pin and connected to the outer end of said duct 78 is a flexible tube or duct 79 that leads from a suitable source of liquid hydrocarbon supply.

The high-pressure air to gasify and support combustion of the liquid hydro-carbon delivered into the pre-combustion chamber 72, passes through a duct 80 that is formed through the wall of cylinder 67, and when the piston 68 is moved to the proper position, this duct 80 registers with a duct 81 that is formed in piston 68 and a continuation 82 of duct 81 communicates with a plurality of jet openings 83 that are formed in plug 75 around the discharge end of duct 76.

The jet openings 83 are slightly inclined with respect to the axis of duct 76, so that the high-pressure air that discharges from said jet openings tends to thoroughly mix with the liquid hydro-carbon discharging from duct 76, and thereby producing a turbulence of the gaseous fuel at the time of its ignition in the pre-combustion chamber 72.

A branch high-pressure air supply duct 84 passes diametrically through piston 68, one end of which duct is adapted to register with duct 80, and the other end registering with an air by-pass 85 that is formed in the inner face of cylinder 67.

Thus, provision is made for delivering liquid hydro-carbon and air under high-pressure into the pre-combustion chambers 72, and the admission of said liquid hydro-carbon and air is controlled by the movements of the pistons 68 in their cylinders.

As the engine piston 30 approaches each end of its travel, the corresponding piston 78 is moved outwardly by the push pin 71, so that the various ducts are in registration with each other, as illustrated in Fig. 5, to permit liquid hydro-carbon and air under high-pressure to discharge from the openings in plug 75 into the ignition and pre-combustion chamber 72.

The means employed for timing the movements of the pistons 68 relative to the movements of piston 30, and which means is illustrated in Figs. 6 to 14 inclusive, will now be described.

Formed integral with the housing or frame 10 on one side thereof, and arranged to the sides of the projecting end of piston pin 31, are vertically disposed walls 87, and secured to the outer vertical edges of these walls are plates 88 that project toward each other. Formed in the adjacent inner edges of these plates are slots 89, that are substantially T-shaped in cross-section.

Secured to plates 88 are horizontally aligned bearings 90 in which is journalled a shaft 91 capable of being manually or mechanically rotated, and carried by said shaft is a pair of eccentrics 92, the high portions of which are arranged 180° apart.

I prefer to provide suitable manually operable means for rotating shaft 91 to shift the position of the eccentrics 92 and such manually operable means may take various forms; for instance, a small hand wheel or a lever and where a lever is used, the same may have associated therewith a conventional pawl or detent that engages the teeth of an arcuate rack.

Arranged for vertical sliding movement on the inner edge of each plate 88 is a pair of blocks 93 and 94, and the pair of blocks on one plate are disposed above shaft 91 and the pair of blocks on the other plate are disposed below said shaft.

Formed on the side of each block is a vertically disposed rib 95 that is T-shaped in cross-section, and which occupies the corresponding T-shaped groove 89.

Projecting outwardly from the inner block of each pair and on the side adjacent the end of the piston pin, is a pair of parallel legs 96, the upper portions of which have bearing in notches 97 that are formed in the outer plug 93 of the pair.

Formed in the inner faces of the legs 96 are grooves 98, and arranged to slide therethrough are the edges of a thin plate 99 of resilient metal, preferably steel, and somewhat similar to a section of a clock spring, and one end of this resilient plate is rigidly secured to block 93. The inner ends of the grooves 98 are curved away from the faces of the blocks 93 and 94, that are adjacent the end of the piston pin 31. (See Fig. 9.)

Surrounding each eccentric 92 is a band or collar 92a, and pivotally connected to the high points of these collars are relatively short rods 92b.

One of these rods is connected to block 94 above the shaft 91, and the other rod is connected to the block 94 below said shaft. Pivotally connected to the low portions of the collars 92a are rods 92c, one of which is connected to the block 93 above the shaft 92, and the lower end of the other rod is connected to the block 93 below the shaft 91.

As a result of this arrangement, when shaft 91 is rotated, the members of the pairs of blocks 93 and 94 will be simultaneously and correspondingly moved toward or away from each other.

It will be understood that the arrangement of the two pairs of blocks 93 and 94 above and below the shaft 91 are reversed with respect to each other; that is, in the pair above the shaft 91, the block 93 is uppermost, and in the pair disposed below shaft 91, block 93 is lowermost.

Formed through the adjacent end of piston pin 31 is a longitudinally disposed opening 100, the inner end of which communicates with the opening through which pushpin 71 operates, and extending lengthwise through this opening 100, is a lever 101 that is fulcrumed on transverse axis 102.

The inner end of this lever 101 is bifurcated, as designated by 103, for engagement with shoulders 104 formed on the intermediate portion of pushpin 71.

Pivoted on horizontal axes 105 in the outer end of lever 101, is a pair of fingers 106 which normally project outwardly from the end of said lever, and which pins are capable of being swung on their axes so as to occupy notches, or recesses 107 that are formed in the end of the lever.

A spring 108 cooperates with the pivoted end of each finger so as to normally hold said finger in position, so that it projects from the end of the lever, as illustrated in Fig. 14.

These fingers are located on opposite sides of the end of the lever 101, as illustrated in Fig. 13, so that said fingers are in position to engage the spring plates 99 carried by the blocks 93.

The operation of my improved engine is as follows:

It will be understood that due to the opposite arrangement of the crank 27 and cranks 27a, the piston and cylinder move simultaneously in opposite directions, and that as the ends of the piston and the cylinder approach each other, gaseous fuel charges will be admitted to the chambers between the ends of the piston and the ends of the cylinder, which gaseous fuel charges are compressed and ignited as a result of the heat developed by high compression, together with the heat of the high pressure air that is admitted to the ignition and pre-combustion chamber 72, and the resulting expansion drives the piston and cylinder in opposite directions and thus practically all of the power produced between the cylinder head and end of the piston as a result of combustion and expansion of the gaseous fuel charge will be transmitted through connecting rods 26 and 59 to the crankshaft.

In Fig. 1, the piston 30 is shown at the lower end of its travel, and the cylinder 21 is at the upper end of its travel. Under such conditions, the upper one of exhaust ports 19 is open to permit the products of combustion to discharge through exhaust manifold 18 and outlet pipe 20.

At this time, the upper set of air inlet ports 57 are open, due to the oscillation of sleeve 29 by the movement of the piston pin into the inclined end 34 of slot 33, and as these ports are open, the air from chamber 46 and ducts 45 is drawn through the open ports 57 to replace the products of combustion that escape through the open upper one of ports 19 through the exhaust manifold.

The reciprocation of cylinder 21 imparts reciprocatory movement to the double-acting pump piston 15, which on both strokes pumps air into the chambers 45 and 46, and which air under a certain degree of pressure, is utilized for supercharging the combustion chambers. As the piston 15 reciprocates, air is alternately drawn into ports 37 and 49 past inlet check valves 39 and 48, and from the chamber 14, the air passes through ports 41 and 52 controlled by check valves 42 and 53 into the annular space 45 and chamber 46.

On the upward travel of the piston after the exhaust function has taken place, as just described, the movement of the piston pin through the inclined portion of 34 of slot 33, oscillates sleeve 29 so as to close the upper one of the exhaust ports 19 and also closing the air inlet ports 57 at the upper end of the cylinder.

As the piston travels upwardly, one of the fingers 106 engages against one of the plates 99 positioned between the blocks 93 and 94, so that lever 101 is swung on its axis, thereby elevating pushpin 71 and moving the upper one of the pistons 68 upwardly through its cylinder against the resistance of the corresponding spring 70 so as to bring the plug 75 into position so that the port 76 and jet openings 83 will register with inlet openings 74 into the ignition and pre-combustion chamber 72.

When so positioned, a charge of liquid hydrocarbon passes from duct 78 through duct 76, and discharges into the ignition chamber 72, and at the same time high-pressure air from chamber 65 passes through ducts 80, 81, by-pass 85, duct 86 and jet openings 83, and this air, together with the liquid hydro-carbon, discharges into ignition chamber 72 and passes through outlet port 73 into the chamber between the end of the cylinder and the end of the piston, which last mentioned chamber is decreasing in size due to the travel of the end of the cylinder and the end of the piston toward each other.

At the proper point of compression, the compressed gaseous fuel charge is ignited as a result of the heat generated by high compression, and the expansion following combustion of the gases drives the cylinder upwardly and the piston downwardly, thus accomplishing the power stroke.

On the downward travel of the piston, the other one of the fingers 106 carried by the end of lever 101, engages the other one of the plates 99 which is the plate associated with the blocks 93 and 94, below the shaft 91, so as to swing the inner end of lever 101 downwardly, thereby actuating pushpin 71 so as to move the lower one of the pistons 68 downwardly into the position illustrated in Fig. 5, and thus liquid hydro-carbon and high-pressure air are simultaneously admitted to the ignition and pre-combustion chamber 72 and to the combustion chamber between the lower end of the piston 30 and the lower head 24 of the cylinder.

At the proper point of compression of the gaseous fuel charge between the lower end of the piston and the lower end of the cylinder, ignition and combustion of the compressed gaseous fuel charge takes place, to drive the piston upwardly and the cylinder downwardly.

The piston is lubricated by lubricating oil that is delivered through flexible connections 60a to ducts 60, and this oil passes through ducts 61 to the grooves in the piston that receives the oil rings 30a.

Shaft 91 may be rotated by the manually operable means associated therewith so as to shift the positions of the eccentrics 92 and thereby simultaneously move the members of the pairs of blocks 93 and 94 toward or away from each other, so as to regulate the time periods that the fingers 106 are in engagement with the resilient plates 99, and thereby controlling and regulating the movements of the pistons 68 which control the admission of liquid hydro-carbon and high-pressure air to the ignition and combustion chambers of the engine. In other words, the shaft 91, eccentrics 92, blocks 93 and 94 and associated parts constitute a throttle to control the operation of the engine.

In my improved engine, it will be noted that both ends of the cylinder are solid, without openings for connecting rods or the like, and that said cylinder is connected to the crankshaft by a single connecting rod arranged externally over the cylinder; and further that the piston is provided with solid heads or end portions in each of which is formed an ignition and pre-combustion chamber, and that said piston is connected to the crankshaft by connecting rods that are mounted on pins that project from opposite sides of the piston through slots in the wall of the cylinder.

In some instances, and particularly where design makes it desirable, the piston pin may project from one side only of the piston and also through one side only of the sleeve and cylinder and said projecting end is connected by a conventional connecting rod to one of the cranks of the crank shaft.

Thus the piston and cylinder each having both of their ends that cooperate to perform their intended functions in the development and transmission of power to the crankshaft combined with the other parts of the engine in providing a compensating compound internal combustion engine.

While I have shown and described my invention embodied in an internal combustion engine, it will be understood that the principal features of my invention may be advantageously employed for the economical production of power from steam or any other expanding gas or fluid.

By injecting water-vapor or steam into the combustion chambers to combine with the fuel admitted thereinto, the power development resulting from the combustion of such mixture is materially increased as compared to the power development that is produced solely from the expansive forces of hydrocarbon fuel.

As the products of combustion discharge from the combustion chambers, the pressure is materially reduced therein, thus creating a vacuum condition within the combustion chambers, and which condition is enhanced due to the velocity of flow of the exhaust gases, and this vacuum condition and pull of the exhausting gases draws air into the combustion chambers to replace the burned and exhausted gases. This air entering the combustion chambers under such conditions creates a high degree of turbulence and such results are attained without the assistance of mechanical or other auxiliary equipment.

This air inlet follows the exhaust action the same as the suction stroke of a conventional four-stroke cycle engine, and the escaping gases produce substantially the same effect as the piston of a four-stroke cycle engine during the intake stroke.

In an engine, as herein illustrated and described, the means for controlling the admission of gaseous fuel charges into the ignition and pre-combustion chambers are shown and described as being in the form of pistons, but it will be understood that with minor changes in construction, these gaseous fuel admission control elements may take the form of rotary valves that are actuated in proper time relation to the movements of the piston.

Thus it will be seen that I have provided an internal combustion engine that operates on one stroke cycle principal, and which engine is highly effective in the development of power due to the fact that practically all of the expansive forces of the ignited fuel charges are delivered directly from the reciprocating cylinder and piston to the crankshaft, at points on opposite sides of the axis of said crankshaft.

It will be understood that minor changes in the size, form and construction of the various parts of my improved internal combustion engine may be made and substituted for those herein shown and described, without departing from the spirit of the invention, the scope of which is set forth in the appended claims.

I claim as my invention:

1. In an engine, a supporting structure, a cylinder mounted for reciprocatory movement in said supporting structure, a piston mounted for reciprocatory movement within said cylinder, a crankshaft, a connection from said cylinder to one of the cranks of said crankshaft, connections from the piston to other cranks of said crankshaft, said piston being provided in both ends with an ignition and precombustion chamber, means for admitting air under pressure and liquid hydro-carbon to said ignition and precombustion chamber and adjustable means for controlling the admission of air and liquid hydro-carbon to said ignition and precombustion chambers.

2. In an engine, a supporting structure, a cylinder mounted for reciprocatory movement in said supporting structure, a piston mounted for reciprocatory movement within said cylinder, a crankshaft located beyond one end of the supporting structure, a connection from one end of said cylinder to one of the cranks of said crankshaft, a connection from the center of said piston to another one of the cranks of said crankshaft and means for admitting air under pressure into the ends of said cylinder for scavenging the products of combustion therefrom.

3. In an engine, a supporting structure, a cylinder mounted for reciprocatory movement in said supporting structure, a piston mounted for reciprocatory movement within said cylinder, a crankshaft mounted for operation beyond one end of said supporting structure, a connection from one end of said cylinder to one of the cranks of said crankshaft, a connection from the center of said piston to another one of the cranks of said crankshaft and an air pump actuated by said reciprocating cylinder.

4. In an engine, a supporting structure, a cylinder mounted for reciprocatory movement in said supporting structure, a piston mounted for reciprocatory movement within said cylinder, a crankshaft mounted for operation beyond one end of said supporting structure, a connection from one end of said cylinder to one of the cranks of said crankshaft, a connection from the center of said piston to another one of the cranks of said crankshaft, an air pump actuated by said reciprocating cylinder and means for delivering air from said pump into the ends of said cylinder to scavenge the products of combustion therefrom.

5. In an engine, a supporting structure, a cylinder arranged for reciprocatory movement in said supporting structure heads in both ends of said cylinder, a piston arranged for reciprocatory movement within said cylinder each end of the piston having an ignition and precombustion a pin seated in and projecting radially from the center of said piston, a crankshaft and connections between one end of said cylinder and from said piston pin to the cranks of said crankshaft whereby the motion of said cylinder and piston is simultaneously delivered to said crankshaft at points on opposite sides of its axis.

6. In an engine, a supporting structure, a cylinder arranged for reciprocatory movement in said supporting structure, a piston arranged for reciprocatory movement within said cylinder, a crankshaft, connections between said cylinder and piston and the cranks of said crankshaft whereby the motion of said cylinder and piston is simultaneously delivered to said crankshaft to points on opposite sides of its axis, means for delivering gaseous fuel charges alternately into the chambers between the ends of the piston and the ends of said cylinder and adjustable means for controlling the admission of gaseous fuel to the chambers between the ends of said piston and cylinder.

7. In an internal combustion engine, a supporting structure, a cylinder mounted for reciprocatory movement within said structure, a piston mounted for reciprocatory movement within said cylinder, a sleeve mounted for oscillatory movement between said piston and cylinder, said sleeve being provided at both ends with air inlet ports that are adapted to register with air inlet ports in the ends of the cylinder as said sleeve is oscillated and means carried by the piston for imparting oscillatory movement to said sleeve.

8. In an internal combustion engine, a supporting structure, a cylinder mounted for reciprocatory movement within said structure, a piston mounted for reciprocatory movement within said cylinder, a sleeve mounted for oscillatory movement between said piston and cylinder, said sleeve being provided at both ends with air inlet ports that are adapted to register with air inlet ports in the ends of the cylinder as said sleeve is oscillated, means carried by the piston for imparting oscillatory movement to said sleeve and means for admitting liquid hydro-carbon and air under pressure through the piston into the chambers between the ends of said piston and the ends of said cylinder.

9. In an engine, the combination with a cylinder mounted for reciprocatory movement within said cylinder, a piston pin carried by said piston, a crankshaft, connections from said cylinder and said piston pin to said crankshaft on opposite sides of its axis and said piston and piston pin being provided with ducts for the admission of gaseous fuel charges into the chambers between the ends of said piston and the ends of said cylinder.

10. In an engine, the combination with a cylinder mounted for reciprocatory movement within said cylinder, a piston pin carried by said piston, a crankshaft, connections from said cylinder and said piston pin to said crankshaft on opposite sides of its axis, said piston and piston pin being provided with ducts for the admission of gaseous fuel charges into the chambers between the ends of said piston and the ends of said cylinder and adjustable means for controlling the admission of gaseous fuel charges through said piston pin and piston.

11. In an engine, the combination with a cylinder mounted for reciprocatory movement within said cylinder, a piston pin carried by said piston, a crankshaft, connections from said cylinder and said piston pin to said crankshaft on opposite sides of its axis, said piston and piston pin being provided with ducts for the admission of gaseous fuel charges into the chambers between the ends of said piston and the ends of said cylinder, adjustable means for controlling the admission of gaseous fuel charges through said piston pin and piston and means for admitting air into the chambers between the ends of the piston and the ends of the cylinder to scavenge the products of combustion from said chambers.

12. In an engine, the combination with a cylinder mounted for reciprocatory movement, of a piston mounted for reciprocatory movement within said cylinder, a piston pin carried by said piston, a crankshaft, connections from said cylinder and said piston pin to said crankshaft on opposite sides of its axis, both ends of the piston being provided with admission and precombustion chambers and means for admitting gaseous fuel charges through said piston pin to said ignition and precombustion chambers.

13. In an engine, the combination with a cylinder mounted for reciprocatory movement, of a piston mounted for reciprocatory movement within said cylinder, a piston pin carried by said piston, a crankshaft, connections from said cylinder and said piston pin to said crankshaft on opposite sides of its axis, both ends of the piston being provided with admission and precombustion chambers, means for admitting gaseous fuel charges through said piston pin to said ignition and precombustion chambers and adjustable means for controlling admission of gaseous fuel charges to said ignition and precombustion chambers in accordance with the movement of said piston.

14. In an engine, a cylinder mounted for reciprocatory movement, a double ended piston mounted for reciprocatory movement within said cylinder, the ends of said piston between its periphery and end faces thereof being provided with circumferential inclined faces, packing rings applied to the ends of the piston, which packing rings have inclined faces that engage the corresponding inclined faces on said piston and interengaging shoulders formed on the inclined faces of said piston and said packing rings.

15. In an engine, the combination with a cylinder mounted for reciprocatory movement, said cylinder having solid ends, of a piston mounted for reciprocatory movement within said cylinder, said piston having solid ends, a connecting rod connected to one end of said cylinder, and a connecting rod connected to the center of said piston.

16. In an engine, the combination with a cylinder mounted for reciprocatory movement, said cylinder having solid ends, of a piston mounted for reciprocatory movement within said cylinder, said piston having solid ends, a crankshaft mounted for operation beyond one end of the cylinder, a connecting rod between one end of said cylinder and one of the cranks of said crankshaft, and a connecting rod between the center of said piston and another one of the cranks of said crankshaft.

17. In an engine, the combination with a cylinder mounted for reciprocatory movement, said cylinder having solid ends, of a piston mounted for reciprocatory movement within said cylinder, said piston having solid ends, a pin rigidly seated in and projecting radially from the center of said piston, a crankshaft, a connection from one end of said cylinder to one of the cranks of said crankshaft and connections from said piston pin to another one of the cranks of said crankshaft, a portion of which last-mentioned connections pass through an opening in the side of the cylinder.

18. In an engine, a supporting structure, a cylinder mounted for reciprocatory movement in said supporting structure, fixed heads closing both ends of said cylinder, a double-ended piston mounted for reciprocatory movement within said cylinder, said piston being provided in each end with an ignition and precombustion chamber, a crankshaft mounted for rotation beyond one end of the cylinder, a connection from one end of said cylinder to one of the cranks of said crankshaft and a connection from one central portion of said piston to another one of the cranks of said crankshaft.

19. In an engine, a supporting structure, a cylinder mounted for reciprocatory movement in said supporting structure, a piston mounted for reciprocatory movement within said cylinder, fixed heads closing both ends of said cylinder, a double-ended piston mounted for reciprocatory movement within said cylinder, a crankshaft arranged for operation beyond one end of the cylinder, a connection from one end of said cylinder to one of the cranks of the crankshaft, a connection from the central portion of said piston to another one of the cranks of said crankshaft, said piston being provided in both ends with an ignition and precombustion chamber and means for admitting air under pressure and liquid hydrocarbon to said ignition and precombustion chambers.

20. In an engine, a supporting structure, a cylinder arranged for reciprocatory movement in said supporting structure, a head in each end of said cylinder, a piston arranged for reciprocatory movement within said cylinder, each end of said piston containing an ignition and precombustion chamber, a pin seated in and projecting radially from the center of the piston, a crankshaft, connections between one end of said cylinder and from said piston pin to the cranks of said crankshaft whereby the motion of said cylinder and piston is simultaneously delivered to said crankshaft at points on opposite sides of its axis and means for delivering gaseous fuel charges alternately into the chambers between the ends of the piston and the heads in the ends of said cylinder.

WARD PHILLIPS.